Figure 1:
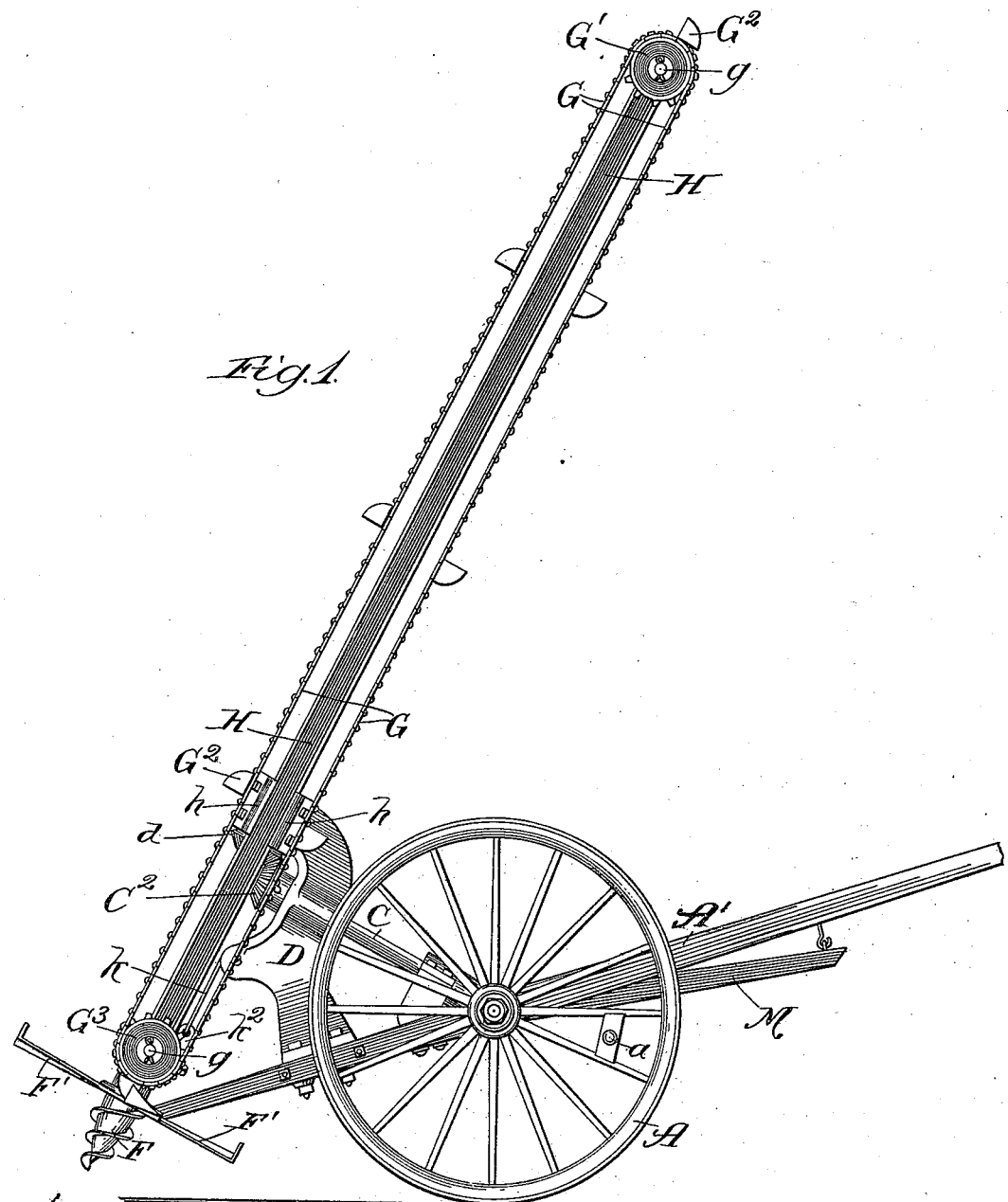

(No Model.)  3 Sheets—Sheet 1.

J. T. HERZA.
HOLE BORING MACHINE.

No. 556,349. Patented Mar. 17, 1896.

Witnesses:
Inventor:
Joseph T. Herza,
By Banning & Banning & Sheridan,
Attys.

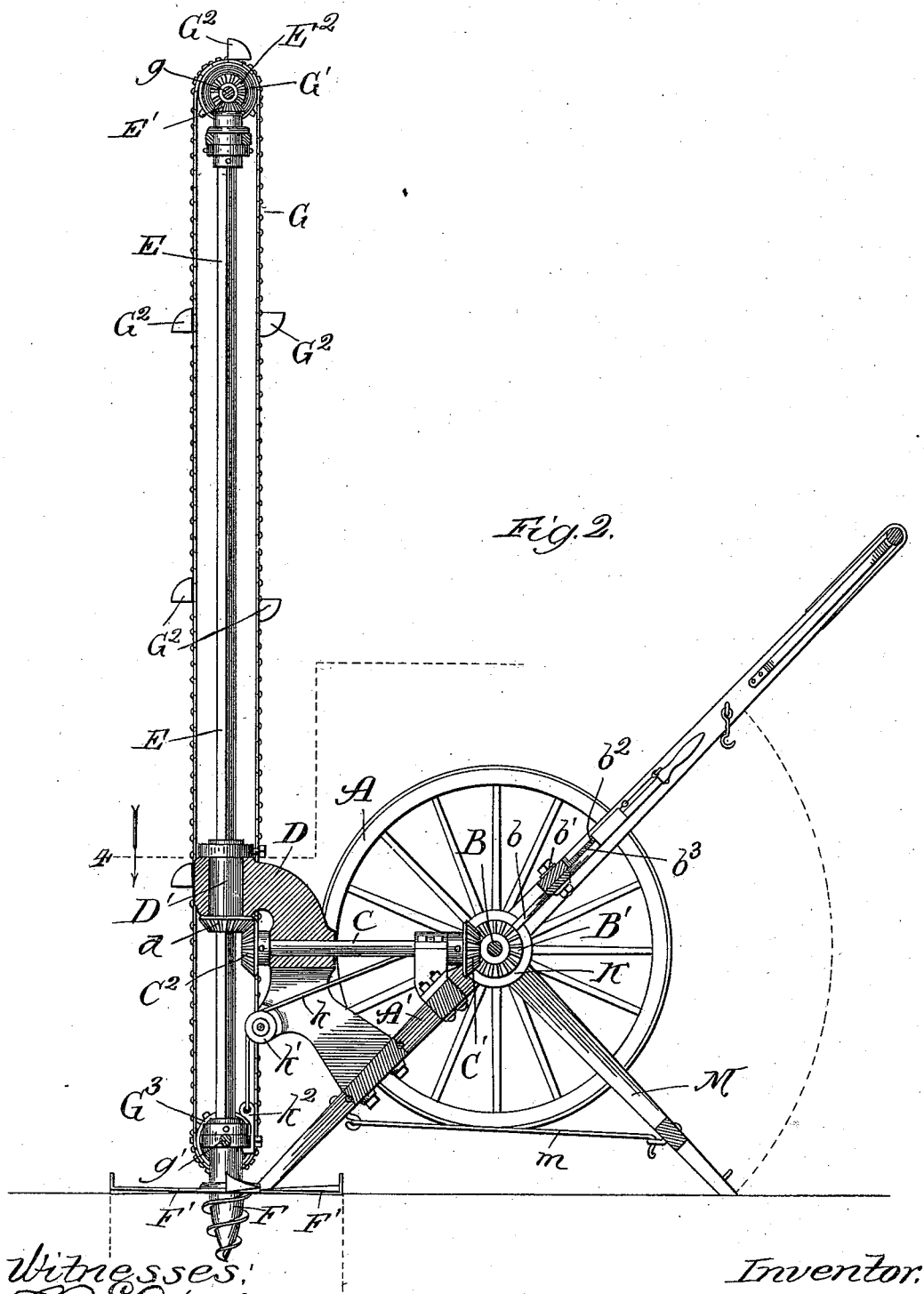

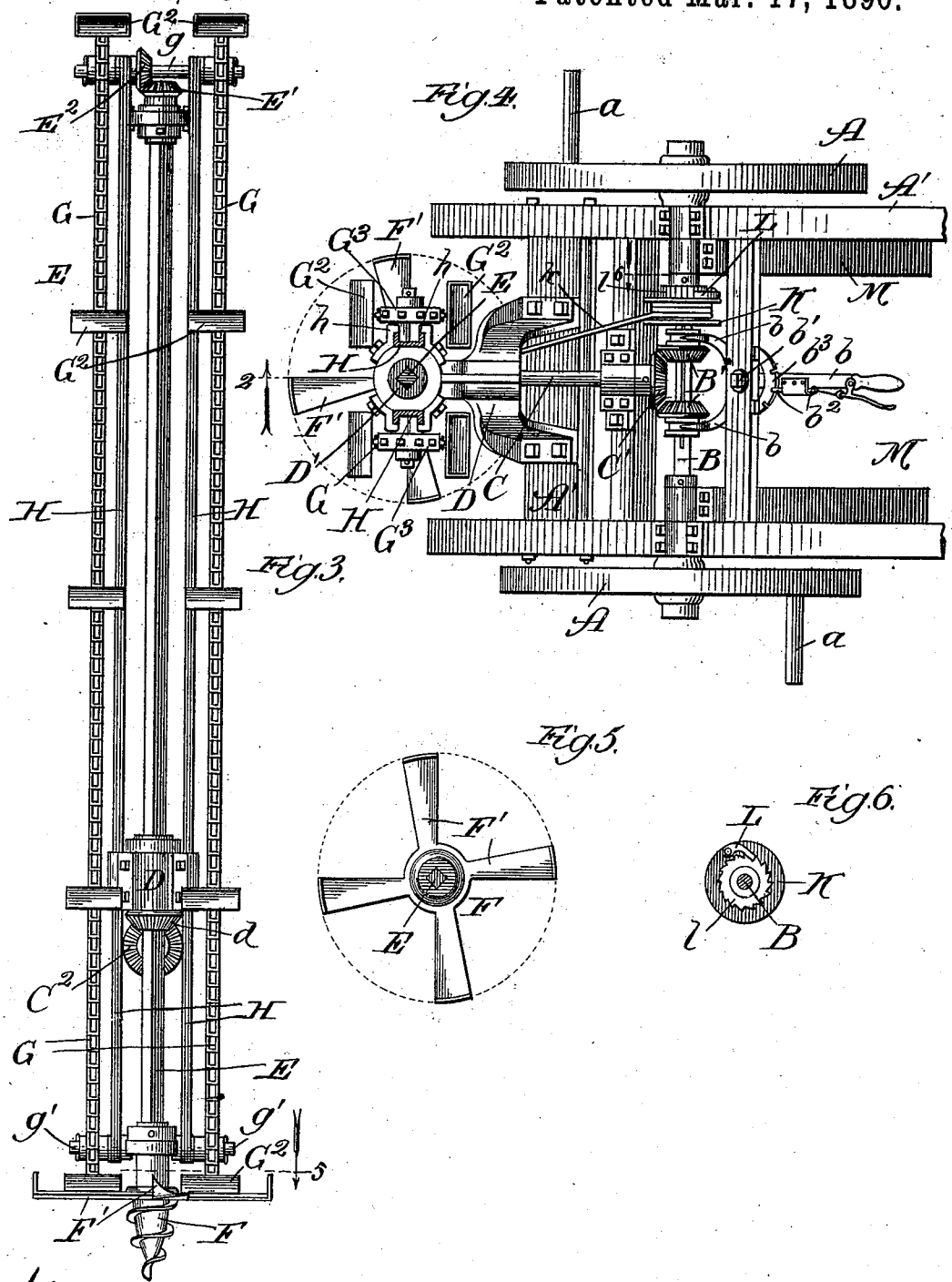

UNITED STATES PATENT OFFICE.

JOSEPH T. HERZA, OF RIDGELAND, ILLINOIS.

HOLE-BORING MACHINE.

SPECIFICATION forming part of Letters Patent No. 556,349, dated March 17, 1896.

Application filed April 3, 1895. Serial No. 544,281. (No model.)

*To all whom it may concern:*

Be it known that I, JOSEPH T. HERZA, of Ridgeland, Cook county, Illinois, have invented certain new and useful Improvements in Hole-Boring Machines, of which the following is a specification.

The object of my invention has more particular reference to machines for boring postholes; and the invention consists in the features, combinations and details of construction hereinafter described and claimed.

In the drawings, Figure 1 is a side elevation of my improved hole-boring machine when in position for transportation from one place to another; Fig. 2, a vertical section taken on line 2 of Fig. 4, showing the machine in operative position; Fig. 3, a rear elevation of the boring and elevating apparatus; Fig. 4, a plan section taken on line 4 of Fig. 2; Fig. 5, a plan view taken on line 5 of Fig. 3, and Fig. 6 a sectional elevation taken on line 6 of Fig. 4.

In making my improved hole-boring machine I make carrying-wheels A, on which a truck A' carrying the operative parts is intended to be mounted, so that the machine as a whole is portable and readily moved from place to place. These wheels are provided with removable handles or cranks $a$, by which they may be rotated, as hereinafter explained. The axle B is intended to be fast or rigidly secured to the wheels, so as to rotate with them. Mounted on the axle are miter-gears B', which are intended to be keyed or otherwise fastened to the axle, so as to rotate with it. These miter-gears are arranged so that they may be moved longitudinally on the axis by a bifurcated lever $b$, fulcrumed or pivoted in the frame at $b'$, so that its bifurcated ends may be shifted toward the one side or the other and thus move the miter-gears with them. A spring-retaining dog $b^2$ and segment $b^3$ enable the operator to fasten the bifurcated lever in a desired position. When in the position shown in Fig. 4 the miter-gears are in their normal or inoperative position.

Mounted on the frame in a horizontal position is arranged a shaft C, that extends to the rear of the machine and which is held in suitable supports or brackets, as shown in Fig. 2. A miter-gear C' is mounted on the inner end of this shaft and a miter-gear $C^2$ is mounted on its outer end, fast with the shaft, so as to rotate with it. The gear C' is so arranged that when the bifurcated lever $b$ is shifted to one side one of the miter-gears, B', will be brought into engagement or mesh with it, and as it is rotated rotation will be imparted to the shaft C.

A support or bracket D is mounted on the framework and has a sleeve D' journaled in it, provided with a miter-gear $d$, which meshes with the gear $C^2$, so that as the shaft C is rotated the sleeve D' will be rotated also.

I arrange in the sleeve D' a shaft E, which is preferably angular-shaped in cross-section and which rotates with the sleeve, though, if desired, it may be made round and feathered in the sleeve, so as to rotate with it. At the lower end of this shaft is arranged the auger F, provided with blades F' adapted to bore or cut a hole in the earth as the auger is rotated by the rotation of the shaft E. These blades or cutters loosen and cast up the earth, so that it is in position to be removed from the hole. To effect this, I arrange sprocket-chains G, passing around sprocket-wheels G', arranged on a shaft $g$ at the upper end of the shaft E, and sprocket-wheels $G^3$ arranged on trunnions $g'$ at the lower end of the shaft E. These chains carry buckets $G^2$, which dip up the loosened and disintegrated material and carry it to the top of the shaft, when it is thrown a sufficient distance by the passage of the bucket over the top to be out of the way.

In order to rotate the wheels, I arrange a miter-gear E' at the top of the shaft E, which causes it to mesh or engage with a miter-gear $E^2$ on the shaft $g$, on which the upper sprocket-wheels are mounted, so as to rotate such shaft and cause the elevator-chains, with their buckets, to be carried around. As the hole is bored in the earth, the shaft E moves down by its own gravity, so that the hole may be bored to the desired depth. In order that the sprocket-chains, with their buckets, may move down with the auger and continue to perform their work, I have journaled the shaft $g$ and the trunnions $g'$ in vertical bars H, which pass through guideways $h$, which keep them in their proper position, while permitting longitudinal movement of the bars. After the hole has been bored to the desired depth, the auger, shaft, sprocket-chain, and other parts may be raised or hoisted through means of the drum K, loosely mounted on the shaft B, from which a rope or cable K passes over a pulley $k'$ to a clip $k^2$, to which it is fastened. A dog L, pivoted on the drum, is adapted to engage with the teeth of a ratchet-wheel $l$, fastened to the shaft B, so that when the dog is put into engagement with the teeth the drum may be rotated and the boring apparatus elevated out of the ground.

In Fig. 1 I have shown the boring apparatus as elevated into position for transportation. When it is desired to bore a hole, the legs M are unhooked from the tongue and their forward ends lowered to the ground, the truck tilted and its rear ends lowered to the ground, and the wheels raised from the ground into the position shown in Fig. 2. When in this position a rod $m$ may be used to prevent the parts from spreading. As the wheels are now free from the ground, the handles or cranks may be inserted so that the wheels may be rotated by the application of manual or other power, so as to rotate the shaft B and put the parts above described into operation. When the boring is completed the boring-tool may be raised or elevated, the truck again tilted and the wheels brought to the ground, when the apparatus may be moved to another place to bore another hole.

While I have described the parts with considerable minuteness of detail, I desire it to be understood that I do not propose to limit myself in unimportant features to the exact construction shown and described. For instance, I have shown and described two miter-gears on the axle, either one of which may be brought into engagement with the miter-gear on the inner end of the horizontal shaft. As but one of the miter-gears on the axle is required to do the work, I do not desire to limit myself to them both. I mention this as an illustration of mechanical changes and modifications that can obviously be employed.

When I speak in the specification and claims of a "horizontal" or a "vertical" shaft, I mean to describe the relative position of the parts when the machine is in working or operative position, as shown in Fig. 2, and when I speak of "miter-gears" I mean gears for transmitting power from one shaft to another arranged at an angle thereto.

What I regard as new, and desire to secure by Letters Patent, is—

1. In hole-boring machines, the combination of carrying-wheels, an axle that rotates with them, miter-gears arranged on the axle and rotating with it, a truck mounted on the axle and adapted to have its rear ends lowered to the ground to bring the parts into operative or boring position and raised from the ground to bring them into inoperative or transporting position, a horizontal shaft arranged in bearings on the truck, miter-gears arranged on the ends of the horizontal shaft and rotating with it, means for throwing the miter-gears on the axle into engagement with the miter-gear on the inner end of the horizontal shaft, a vertical shaft, a miter-gear adapted to rotate the vertical shaft engaging with the miter-gear on the outer end of the horizontal shaft, and an auger on the lower end of the vertical shaft rotating with it, substantially as described.

2. In hole-boring machines, the combination of carrying-wheels, an axle that rotates with them, miter-gears arranged on the axle and rotating with it, a truck mounted on the axle and adapted to have its rear ends lowered to the ground to bring the parts into operative or boring position and raised from the ground to bring them into inoperative or transporting position, a horizontal shaft arranged in bearings on the truck, miter-gears arranged on the ends of the horizontal shaft and rotating with it, means for throwing the miter-gears on the axle into engagement with the miter-gear on the inner end of the horizontal shaft, a vertical shaft, a miter-gear adapted to rotate the vertical shaft engaging with the miter-gear on the outer end of the horizontal shaft, an auger on the lower end of the vertical shaft and rotating with it, and legs journaled on the axle and adapted to have their forward ends lowered to the ground to form with the rear ends of the truck, when lowered, supports for holding the wheels free from the ground, substantially as described.

3. In hole-boring machines, the combination of carrying-wheels, an axle that rotates with them, miter-gears on the axle and rotating with it, a truck mounted on the axle and adapted to have its rear ends lowered to the ground to bring the parts into operative or boring position and raised from the ground to bring them into inoperative or transporting position, a horizontal shaft arranged in bearings on the truck, miter-gears arranged on the ends of the horizontal shaft and rotating with it, means for throwing the miter-gears on the axle into engagement with the miter-gear on the inner end of the horizontal shaft, a vertical shaft, a miter-gear adapted to rotate the vertical shaft engaging with the miter-gear on the outer end of the horizontal shaft, an auger on the lower end of the vertical shaft and rotating with it, and means for elevating and carrying away the earth as loosened and disintegrated by the auger, substantially as described.

4. In hole-boring machines, the combination of carrying-wheels, an axle that rotates with them, miter-gears on the axle and rotating with it, a truck mounted on the axle and adapted to have its rear ends lowered to the ground to bring the parts into operative or boring position and raised from the ground to bring them into inoperative or transporting position, a horizontal shaft arranged in bearings on the truck, miter-gears arranged on the ends of the horizontal shaft and rotating with it, means for throwing the miter-gears on the axle into engagement with the miter-gear on the inner end of the horizontal shaft, a vertical shaft, a miter-gear adapted to rotate the vertical shaft engaging with the miter-gear on the outer end of the horizontal shaft, an auger on the lower end of the vertical shaft and rotating with it, and means for raising the boring apparatus from the ground when the hole is bored to the desired depth, substantially as described.

JOSEPH T. HERZA.

Witnesses:
 THOMAS A. BANNING,
 THOMAS B. MCGREGOR.